(12) United States Patent
Renaud-Goud et al.

(10) Patent No.: US 8,264,774 B2
(45) Date of Patent: Sep. 11, 2012

(54) METHOD AND APPARATUS FOR GENERATING RECONSTRUCTIONS OF INFORMATION ENCODED IN AMBIENT LIGHT MODULATORS

(75) Inventors: Philippe Renaud-Goud, Troyes (FR); Pauline Colas, Ris-Orangis (FR)

(73) Assignee: SeeReal Technologies S.A., Munsbach (LU)

( * ) Notice: Subject to any disclaimer, the term of this patent is extended or adjusted under 35 U.S.C. 154(b) by 378 days.

(21) Appl. No.: 12/306,558

(22) PCT Filed: Jun. 22, 2007

(86) PCT No.: PCT/EP2007/056265
§ 371 (c)(1),
(2), (4) Date: Apr. 12, 2010

(87) PCT Pub. No.: WO2008/000703
PCT Pub. Date: Jan. 3, 2008

(65) Prior Publication Data
US 2010/0188718 A1 Jul. 29, 2010

(30) Foreign Application Priority Data
Jun. 28, 2006 (DE) .......................... 10 2006 030 535

(51) Int. Cl.
G02B 27/10 (2006.01)
G02B 26/00 (2006.01)

(52) U.S. Cl. ........................................ 359/618; 359/237

(58) Field of Classification Search .................. 359/237, 359/290, 618, 629, 636
See application file for complete search history.

(56) References Cited

U.S. PATENT DOCUMENTS
2010/0271676 A1* 10/2010 Renaud-Goud .................... 359/9

OTHER PUBLICATIONS

Kannan et al., "Cross-talk analysis and rejection in fully parallel matrix-matrix multipliers," Applied Optics, OSA, Optical Society of America, Washington, DC vol. 34, No. 29, pp. 6752-6757 (Oct. 10, 1995) XP000529170.
Horikoshi et al., "Computer generated holography using complex interference patterns," Proceedings of the SPIE, SPIE, Bellingham, VA vol. 3293, pp. 30-37 (Jan. 26, 1998) XP000862888.
Shikama et al., "Pixel image analysis of light valve projector considering apodization caused by illumination," Society of Photo-Optical Instrumentation Engineers, Opt. Eng. 43(6), pp. 1375-1380 (Jun. 2004).
Tudela et al., "Wavefront reconstruction by adding modulation capabilities of two liquid crystal devices," Opt. Eng. 43(11), pp. 2650-2657 (Nov. 2004).
Maeno et al., "Electro-holographic display using 15mega pixels LCD," SPIE, vol. 2652/15 (Mar. 1996).

* cited by examiner

Primary Examiner — William Choi
(74) Attorney, Agent, or Firm — Saul Ewing LLP (57) ABSTRACT

The present invention relates to a method and device for the generation of reconstructions of information encoded on spatial light modulators by way of illumination with coherent incident waves. The invention includes the following steps: Splitting of the incident wave into at least two incident sub-waves, Modulation of the incident sub-waves with the help of selected apodization functions so to form modulated incident sub-waves, Direction of the modulated incident sub-waves towards the corresponding, spatially separated and pixel-matrix-shifted spatial light modulators, Diffraction of the modulated incident sub-waves at the encoded pixels of the respective spatial light modulators, Additive combination of the sub-waves emitted by the respective spatial light modulators to form one common emitted wave, and Transformation of the emitted wave into the Fourier plane with the help of a projection system.

23 Claims, 8 Drawing Sheets

METHOD AND APPARATUS FOR GENERATING RECONSTRUCTIONS OF INFORMATION ENCODED IN AMBIENT LIGHT MODULATORS

CROSS REFERENCE TO RELATED APPLICATIONS

This application claims the priority of PCT/EP2007/056265, filed on Jun. 22, 2007, which claims priority to DE 10 2006 030535.3, filed Jun. 28, 2006, the entire contents of which are hereby incorporated in total by reference.

The present invention relates to a method and device for the generation of reconstructions of information encoded on spatial light modulators by way of illumination with coherent incident waves, where the information is encoded in controllable pixels of a pixel matrix, which is combined with an inter-pixel matrix in the form of an electrode grating, both being contained in a spatial light modulator, comprising the following components:
- A light source for the illumination of the spatial light modulators with coherent incident waves,
- A beam splitter device, which is disposed downstream the light source and which splits the incident wave up into incident sub-waves,
- At least two spatial light modulators which receive the respective directed incident sub-waves from the beam splitter device,
- Where the sub-waves emitted by the spatial light modulators are recombined towards a projection system so as to form a common emitted wave.

Liquid crystal displays (LCDs) are spatial light modulators (SLM). They comprise a transmissive or reflective layer of material—a liquid crystal layer with a grating of thin electrodes—where the grating represents a matrix of electrodes which intersect at right angles, thus forming rectangular regions between the electrodes, the so-called pixels. The matrix of electrodes is also known as the inter-pixel matrix. It can be switched with the help of an electronic controller, in particular with the help of a computer with programming means, in order to encode the pixels such that they exhibit a certain transmittance or reflectance. Pixels which are encoded as transmissive pixels let the incident waves pass, while the pixels which are encoded as reflective pixels reflect the incident waves. This makes it possible to encode holograms too on the spatial light modulators.

One problem is that when illuminating computer-generated holograms encoded on the LCDs or spatial light modulator, the reconstructions created in front of or behind the hologram have a relatively low resolution, which is caused by overlapping of the diffraction orders generated during diffraction of the coherent incident waves at the transmissive pixels or during reflection of the coherent incident waves at the reflective pixels.

BACKGROUND OF THE INVENTION

Moreover, there are problems due to disturbing direct reflections which occur with reflective spatial light modulators due to reflection of the incident waves at the inter-pixel matrix.

It is known that in the Fourier plane the rectangular transmissive pixels exhibit an intensity distribution in the form of a sinc function of $$-\operatorname{sinc}(x) = \frac{\sin(\pi x)}{\pi x},$$

provided they are illuminated with coherent light. The higher diffraction orders expand at the side bands/side wings according to the scanning.

In their essay "Cross-talk analysis and reduction in fully parallel matrix-matrix multipliers", *Applied Optics*, Vol. 34, No. 29, October 1995, p. 6752-6757, K. Raj and R. A. Athale describe an apodisation method of multiplicatively-coupled spatial light modulators, where analogue optical processors, which calculate a product of the matrices of two spatial light modulators, are analysed as regards cross-talk. It was found that the side bands of the sinc function in the Fourier plane, which correspond with the individual pixels of the spatial light modulator, are the main cause for cross-talk. Cross-talk can be reduced mainly by using an apodisation function for the individual pixels in the spatial light modulator. Pixel-wise apodisation is performed using an apodisation-function-containing mask, which is disposed immediately in front of the spatial light modulator, seen in the direction of light propagation.

A specialty is the fact that it is an apodisation of multiplicatively-coupled spatial light modulators, where the spatial light modulators are disposed one behind another in an optical path which passes through both spatial light modulators, said optical path also containing the illumination of the mask which comprises the apodisation function. Moreover, the arrangement of the apodisation mask immediately in front of the spatial light modulators is rather difficult to achieve.

A method for apodisation by way of illumination is known from the essay "Pixel image analysis of light valve projector considering apodisation caused by illumination" by S. Shikama, H. Suzuki, T. Endo and A. Sekiguchi, published in *Opt. Eng.* 43(6), June 2004, p. 1378-1380, according to which the apodisation is to be performed in the entrance pupil of an optical projection system in a light projector. The apodisation is here performed for the pupil of the optical system, but not for the object to be transformed: the pixel matrix of the spatial light modulator.

In their essay "Wave-front reconstruction by adding modulation capabilities of two liquid crystal devices", *Opt. Eng.* 43(11), November 2004, p. 2650-2657, R. Tudela, E. Martin-Badosa, I. Labastida and A. Carnicer describe a method of additive coupling of two liquid crystal displays for wave-front reconstruction, where the additive superposition of wave fronts encoded in the spatial light modulators is achieved with the help of a beam splitter element. One drawback is that although there is an additive superposition of the spatial light modulators, the apodisation of the pixel arrays does not play a role.

In their essay "Electro-holographic display using 15 mega pixels LCD", *SPIE* Vol. 2652/15, K. Maeno, N. Fukaya, O. Nishikawa et al. describe an electroholographic display, where an increase of the resolution of the spatial light modulators used for encoding the hologram is to be achieved by way of arranging side by side (tiling) several spatial light modulators in one dimension or two dimensions. In this particular electroholographic display five LCD panels are arranged side by side. Increasing the size of the entire display causes problems in particular with the optical systems which are required for Fourier transformation of the information encoded on the display. Moreover, totally gapless tiling is not possible, so that there are discontinuities in the encoded information.

SUMMARY OF THE INVENTION

Now, the object of the present invention is to provide a method and a device for the generation of reconstructions of information encoded on spatial light modulators, said method and device being of such a nature that an improvement in resolution in the reconstructions is ensured, where the mutual disturbance by higher diffraction orders, in particular between the Fourier transforms due to the periodicity of the Fourier spectrum due to the discrete encoding are widely to be suppressed. Moreover, the problems in reflective spatial light modulators with direct reflection of the incident wave at the inter-pixel matrix are to be greatly minimised. Further, the resolution is to be improved by additive superposition of several spatial light modulators, thereby avoiding the problems which are commonly associated with tiling methods.

This object has been achieved by the features of claims 1 and 8.

The method for the generation of reconstructions of information encoded on spatial light modulators by way of illumination with coherent incident waves, where the information is encoded in controllable pixels of a pixel matrix with inter-pixel matrix in the form of an electrode grating, which is provided in a spatial light modulator, comprises the following steps, according to the characterising part of claim 1:

Splitting of the incident wave into at least two incident sub-waves,

Modulation of the incident sub-waves with the help of selected apodisation functions so as to form modulated incident sub-waves, Direction of the modulated incident sub-waves towards the corresponding, spatially separated and pixel-matrix-shifted spatial light modulators, Diffraction of the modulated incident sub-waves at the encoded pixels of the respective spatial light modulators, Additive combination of the sub-waves emitted by the respective spatial light modulators to form one common emitted wave, and Transformation of the emitted wave into the Fourier plane with the help of a projection system.

The incident sub-waves which fall on two corresponding spatial light modulators can thereby preferably be modulated with complementary apodisation functions so that there will be a spatially constant illumination in the superposition.

The complementary modulated incident sub-waves are generated on the basis of the original incident wave, where the incident sub-waves are coherent among one another and their amplitudes show a periodicity with local minima and maxima.

If illuminated with coherent light, the pixels of the spatially separated spatial light modulators are centred on to the amplitude maximum of the respective incident subwave, where the inter-pixels adjacent to the pixels are situated in an amplitude minimum.

Pair-wise arranged spatial light modulators are disposed at a shift such that the pixels of the spatial light modulators are offset by a given distance, in particular by half the pixel pitch (p/2), while the corresponding minima of the amplitudes of the incident wave modulated with the apodisation function are always situated near the inter-pixels.

The apodisation by way of modulating the incident sub-waves effects a suppression of higher diffraction orders of the Fourier transform and the light energy is concentrated in the zeroth order.

The apodisation can be achieved by either amplitude modulation or phase modulation of the incident sub-waves or by a combination of the two.

The method can be implemented with the help of a device for the generation of reconstructions of information encoded on spatial light modulators by way of illumination with coherent incident waves, where the information is encoded in controllable pixels of a pixel matrix with an inter-pixel matrix in the form of an electrode grating, which is provided in a spatial light modulator, where the following components are provided:

A light source for the illumination of the spatial light modulators with coherent incident waves, A beam splitter device, which is disposed downstream the light source and which splits the incident wave up into incident sub-waves, At least two spatial light modulators which receive the respective directed incident sub-waves from the beam splitter device, Where the sub-waves emitted by the spatial light modulators are combined towards a projection system so as to form a common emitted wave, wherein according to the characterising part of claim 9 the beam splitter device is allocated at least one element for the generation of incident sub-waves with according apodisation functions based on the incident wave, wherein the modulated incident sub-waves are directed to the corresponding spatial light modulators, and wherein at least one optical system is provided which combines by way of addition the sub-waves which are emitted by the spatial light modulators so as to form a common emitted wave, wherein the projection system transforms the emitted wave into the Fourier plane.

The incident sub-waves which fall on two corresponding spatial light modulators are modulated with two complementary apodisation functions. The amplitudes of the incident wave and of the modulated incident sub-waves can thereby be defined as follows:

Incident wave with A=1 at homogeneous illumination

First incident sub-wave with $A_1 = \cos^2 x$

Second incident sub-wave with $A_2 = \sin^2 x$ where $A_1 + A_2 = A$, and $A_1 = \cos^2 x$ and $A_2 = \sin^2 x$ are selected apodisation functions.

A spatial light modulator which is virtual by definition can comprise at least two spatial light modulators, where the spatial light modulators are arranged such that if they are illuminated, the pixels of the spatially separated spatial light modulators are centred on to the amplitude maximum of the respective incident sub-wave, where the inter-pixels next to the pixels are situated in an amplitude minimum of the incident sub-wave.

The spatial light modulators are chiefly disposed such that in their additive arrangement the pixels of the spatial light modulators are shifted by a given pixel distance, preferably by half a pixel pitch (p/2).

If two spatial light modulators are used, in their additive arrangement the apodisation is achieved in one dimension, e.g. in the x dimension, while if four spatial light modulators are used, in their additive arrangement the apodisation is achieved or adjusted in two dimensions, e.g. in the x and y dimensions.

The first beam splitter device, which is disposed downstream the light source and which splits the incident wave up into two incident sub-waves, can be followed by at least two further beam splitter devices, all of which splitting the respective incident sub-wave into further sub-waves, and those further beam splitter devices can be followed by four spatial light modulators, which receive the respective further directed incident sub-waves from the beam splitter devices, wherein each beam splitter device is allocated at least one element for the generation of incident sub-waves with according apodisation functions, wherein one modulated incident sub-wave is directed to the corresponding spatial light modulator, and wherein the optical system combines by way of addition the sub-waves which are emitted by the spatial light modulators so as to form a common emitted wave, which is then transformed into the Fourier plane by the projection system.

The incident sub-waves which fall on two corresponding spatial light modulators can again be modulated with two complementary apodisation functions. The amplitudes of the incident waves and of the incident sub-waves can thereby be defined as follows:

Incident wave with A=1 at homogeneous illumination

First incident sub-wave with $A_1 = \cos^2 x$

Second incident sub-wave with $A_2 = \sin^2 x$

Third incident sub-wave with $A_3 = \cos^2 x * \cos^2 y$

Fourth incident sub-wave with $A_4 = \cos^2 x * \sin^2 y$

Fifth incident sub-wave with $A_5 = \sin^2 x * \cos^2 y$

Sixth incident sub-wave with $A_6 = \sin^2 x * \sin^2 y$ where $A_1 + A_2 = A$ and $A_3 + A_4 + A_5 + A_6 = A$, and where the incident sub-waves $A_1, A_2, A_3, A_4, A_5, A_6$ are modulated illumination waves.

The element for generating the incident sub-waves of complementary apodisation functions can for example be a semi-transmissive $\cos^2$ grating.

As an element for apodisation by way of modulation of the illuminating light, the semi-transmissive $\cos^2$ grating for generating the modulated incident sub-waves $A_1 = \cos^2(x)$ and $A_2 = 1 - \cos^2(x) = \sin^2(x)$ can be assigned to the beam splitter device, where the $\cos^2$ grating is disposed between the beam splitter and an optical system which directs the modulated incident sub-wave to the first spatial light modulator, and where the incident sub-wave $A_2 = 1 - \cos^2(x) = \sin^2(x)$ which leaves the beam splitter is directed through another optical system to the second spatial light modulator.

Alternatively, a semi-transmissive plate can be provided as a combining optical system for additive combination of the incident sub-waves so as to form a common emitted wave.

A polarising beam splitter can be used instead of a simple beam splitter for the generation of two complementary incident sub-waves, where the polarising beam splitter is followed by a combination of a first $\lambda/4$ wave plate, the semi-transmissive $\cos^2$ grating and a second $\lambda/4$ wave plate, where the polarisation plane of the incident sub-wave which is reflected at the $\cos^2$ grating is turned by an angle of 90° before it enters the beam splitter, and where the passing wave after passage through the second $\lambda/4$ wave plate is also turned by an angle of 90°, so that the created emitted sub-waves have the same orientation, as regards their polarisation, before they are recombined to form a common emitted wave.

The beam splitter devices can be combined optically with at least one incident wave modulation element which uses an apodisation function known as Blackman function, whose Fourier transform only exhibits very few and very small higher diffraction orders.

The apodisation can also be achieved by a combination of amplitude and phase modulation of the incident sub-waves.

BRIEF DESCRIPTION OF THE DRAWINGS

The present invention is described in more detail below with the help of a number of embodiments and drawings.

DETAILED DESCRIPTION OF THE INVENTION

Figure 1:
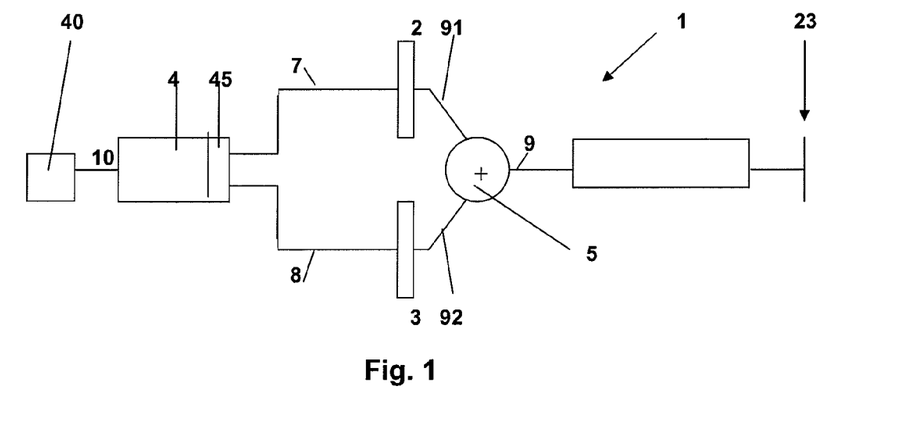
FIG. 1 shows schematically a device for the generation of apodisated reconstructions with the help of two spatially separated spatial light modulators according to the invention.

FIG. 1 shows schematically a device 1 for the generation of reconstructions of information encoded on spatial light modulators 2, 3 by way of illumination with coherent incident waves 10, where the information is encoded in controllable pixels 11 of a pixel matrix, which is combined with an inter-pixel matrix 12 in the form of an electrode grating, both being contained in the spatial light modulators 2, 3, which comprises the following components:

A light source 40 for the illumination of the spatial light modulators with a coherent incident wave 10, A beam splitter device 4, which is disposed downstream the light source 40 and which splits the incident wave 10 up into incident sub-waves 7, 8, Two spatial light modulators 2, 3 which receive the respective directed incident sub-waves 7, 8 from the beam splitter device 4, wherein the sub-waves 91, 92 emitted by the spatial light modulators 2, 3 are recombined towards a projection system 6 so as to form a common emitted wave 9.

According to this invention, the beam splitter device 4 is allocated at least one element 45 for the generation of incident sub-waves 7, 8 with complementary apodisation functions based on the incident wave 10, where the incident sub-waves 7, 8 which are modulated with an apodisation function are directed to the corresponding spatial light modulators 2, 3, and where there is at least one optical system 5 which combines by way of addition the sub-waves 91, 92 which are emitted by the spatial light modulators 2, 3 so as to form a common emitted wave 9, where the projection system 6 transforms the emitted wave 9 into a Fourier plane 23.

The following method according to the invention for the generation of reconstructions with the help of information encoded on the spatial light modulators 2, 3 and illumination with coherent incident waves 10 is realised in the device 1, said method comprising the following steps:

Splitting of the incident wave 10 into two incident sub-waves 7, 8,

Modulation of the incident sub-waves 7, 8 with the help of complementary apodisation functions so as to form modulated incident sub-waves, Direction of the modulated incident sub-waves 7, 8 towards the corresponding, spatially separated and pixel-matrix-shifted spatial light modulators 2, 3, Diffraction of the modulated incident sub-waves 7, 8 at the encoded pixels 11 of the respective spatial light modulators 2, 3, Additive combination of the sub-waves 91, 92 emitted by the respective spatial light modulators 2, 3 to form one common emitted wave 9, and Transformation of the emitted wave 9 into the Fourier plane 23 with the help of a projection system 6.

After modulation with apodisation functions and passage through the respective spatial light modulators 2, 3, which contain the encoded information, the two complementary incident waves 7, 8 are additively superimposed.

Figure 2:
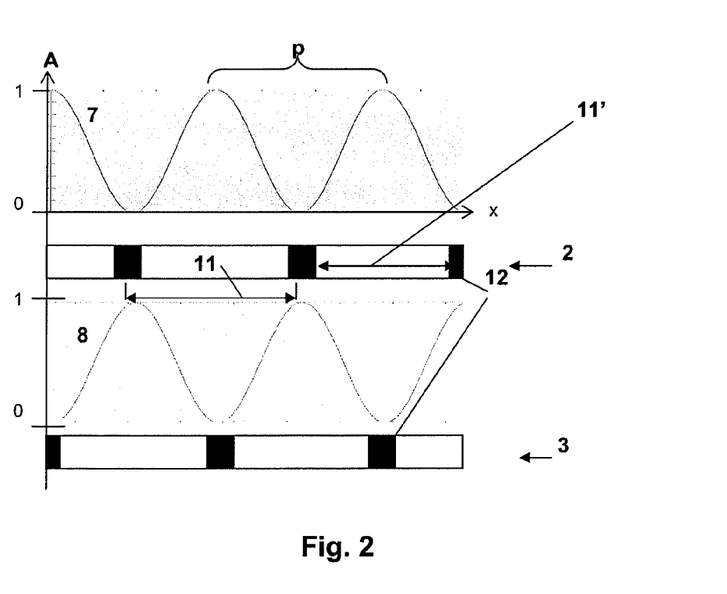
FIG. 2 is a cross-sectional view that shows schematically the pixel-matrix-shifted arrangement of the two spatial light modulators according to FIG. 1 together with the corresponding incident waves in one dimension, which have been modulated with complementary apodisation functions.

The controllable parts of the pixels 11 can in transmissive displays be encoded as transparent pixels 11' or shut pixels, as shown in FIG. 2, and in reflective displays as reflective pixels or absorbing pixels.

The incident sub-waves 7, 8 are coherent among one another and their amplitudes exhibit periodicity with local maxima and minima.

Complementary here means that the sum of the complex amplitudes of the various complementary incident sub-waves 7, 8 equals the complex amplitude of the incident wave 10.

The incident sub-waves 7, 8 are modulated by an apodisation modulation element 45 and, after passage through the spatial light modulators, added by an optical system 5, in order to form within the device 1 a virtual apodisation spatial light modulator which generates an apodisated intensity distribution in the Fourier plane 23, where the virtual spatial light modulator comprises an arrangement of the two spatially separated spatial light modulators 2, 3, where the pixels 11 of the spatial fight modulators 2, 3 are offset and interlaced.

In the device 1 with the two spatially separated spatial light modulators 2, 3, the incident wave 10 (amplitude A=1) is generated and by way of beam splitting and modulation the two incident sub-waves 7, 8 are formed, where the first incident sub-wave 7 is modulated by the apodisation function $\cos^2(x)$ with $A_1 = \cos^2(x)$, and the second incident sub-wave 8 is modulated by the apodisation function $\sin^2(x)$ with $A_2 = \sin^2(x) = 1 - \cos^2(x)$, as shown in FIGS. 1 and 2, and where the two incident sub-waves $A_1 + A_2$ with $A = A_1 + A_2 = 1$ are combined by way of addition after passage through the spatial light modulators 2, 3.

First, as shown in FIG. 2, the spatial light modulators 2, 3 are arranged such that if they are illuminated, the pixels 11 of the spatially separated spatial light modulators 2, 3 are centred on to the amplitude maximum of the respective incident sub-waves 7, 8, where the inter-pixels 12 next to the pixels 11 are situated in an amplitude minimum of the incident sub-waves 7, 8.

Secondly, the spatial light modulators 2, 3 are disposed such that in their additive arrangement the pixels 11 are shifted by half a pixel pitch (p/2). If two spatial light modulators 2, 3 are used, the apodisation is achieved in one dimension, e.g. in the x dimension.

If only one spatial light modulator 2 or 3 is used, i.e. without apodisation in only one direction of the spatial light modulators 2, 3, the complex amplitude A(x) for an ordinary rectangular transmissive pixel 11' of the spatial light modulator 2 or 3 and the corresponding Fourier transform TF(A(x)) can be expressed with the equation (I):

$$A(x) \propto \left(\left(a(x)e^{i\phi(x)} \times sha\left(\frac{x}{\text{pitch}}\right)\right) \otimes rect\left(\frac{x}{pix}\right)\right) \times rect\left(\frac{x}{\text{pupil}}\right) \Rightarrow \quad (I)$$

$$TF(A(x)) =$$

$$\tilde{A}(\upsilon) \propto ((TF(a(x)e^{i\phi(x)}) \otimes sha(\text{pitch} \cdot \upsilon)) \times \text{sinc}(pix \cdot \upsilon)) \otimes \text{sinc}(\text{pupil} \cdot \upsilon)$$

where $a(x)e^{i\phi(x)}$ corresponds with the amplitude and phase which are encoded on the spatial light modulator 2, 3, and where the discrete scanning is described by the function $$sha\left(\frac{x}{\text{pitch}}\right),$$

and where everything is folded according to the function $$rect\left(\frac{x}{pix}\right),$$

which describes the shape and size of the transmissive pixels 11'. The function $$rect\left(\frac{x}{pix}\right)$$

describes the size of the spatial light modulator 2, 3, here called a pupil.

The mentioned functions are defined as follows:

$$sha(x) = \sum_{n=-\infty}^{+\infty} \delta(x-n)$$

where $\delta$ is a Dirac delta function, $$rect(x) = 1 \text{ if } |x| < 1/2$$
$$= 0 \text{ if } |x| > 1/2$$

is a rectangular function, $$\text{sinc}(x) = \frac{\sin(\pi x)}{\pi x}$$

is a Fourier transform of the rectangular function,

The ⊗ sign here describes a convolution.

In the case of a $\cos^2$ apodisation in only one dimension, the following expressions apply for the complex amplitude A(x) at the exit of the spatial light modulator 2 and its Fourier transform:

$$A(x) \propto \left(\left(a(x)e^{i\varphi(x)} \times sha\left(\frac{x}{\text{pitch}}\right)\right) \otimes \left(rect\left(\frac{x}{pix}\right) \times \cos^2\left(\frac{\pi x}{\text{pitch}}\right)\right)\right) \times \quad (II)$$

$$rect\left(\frac{x}{\text{pupil}}\right) \Rightarrow TF(A(x)) =$$

$$\tilde{A}(\upsilon) \propto \left((TF(a(x)e^{i\varphi(x)}) \otimes sha(\text{pitch} \cdot \upsilon)) \times \right.$$

$$\left. \left(\text{sinc}(pix \cdot \upsilon) \otimes TF\left(\cos^2\left(\frac{\pi x}{\text{pitch}}\right)\right)\right)\right) \otimes \text{sinc}(\text{pupil} \cdot \upsilon)$$

If two spatial light modulators 2, 3 are additively arranged and offset by half a pixel pitch p/2, as shown in FIG. 2, and are illuminated by two incident sub-waves 7, 8, one being modulated with a $\cos^2$ function and the other one being modulated with a $\sin^2$ function, in the virtual spatial light modulator always one pixel 11 of the first spatial light modulator 2 is interlaced between two pixels 11 of the second spatial light modulator 3, which in contrast to known side-by-side arrangements (tiling) of multiple spatial light modulators effects an improved resolution without substantial increase in size of the virtual modulator and without disturbing gaps and seams between individual modulator sections.

The ratio of the size of a transmissive pixel 11' and an adjacent opaque inter-pixel 12 can be described by a manufacturing-process-specific fill factor.

A fill factor of 85% means that 85% of the total area of a pixel 11 (transmissive pixel 11' plus inter-pixel 12) is covered by the transmissive pixel 11' and 15% is covered by the inter-pixel 12 (i.e. the area of the adjacent electrode). A fill factor of 100% means that only the transmissive pixel 11' is considered, without considering an inter-pixel 12.

Figure 4:
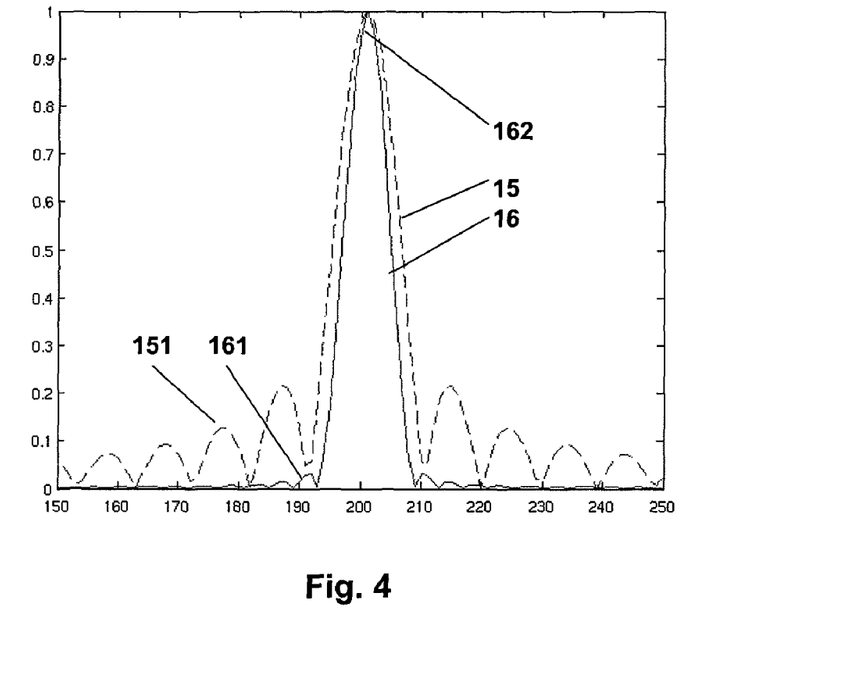
FIG. 4 shows Fourier transforms for a fill factor of 85% for rectangular transmissive pixels (broken line) and for pixels smoothened by an apodisation function (solid line).

In FIG. 4 the fill factor is assumed to be 85%. The Fourier transform 15 for a transmissive pixel 11' is indicated by a broken line, and the Fourier transform 16 for a transmissive pixel smoothened by way of apodisation is indicated by a solid line.

The diffraction orders which extend in the side bands 151 of the unsmoothened sinc function 15, are drastically reduced with the help of the apodisation function, as can be seen in the side bands 161.

There are only few side bands and the amplitudes in those side bands are very low compared with the central band 162 of the Fourier transform.

Figure 5:
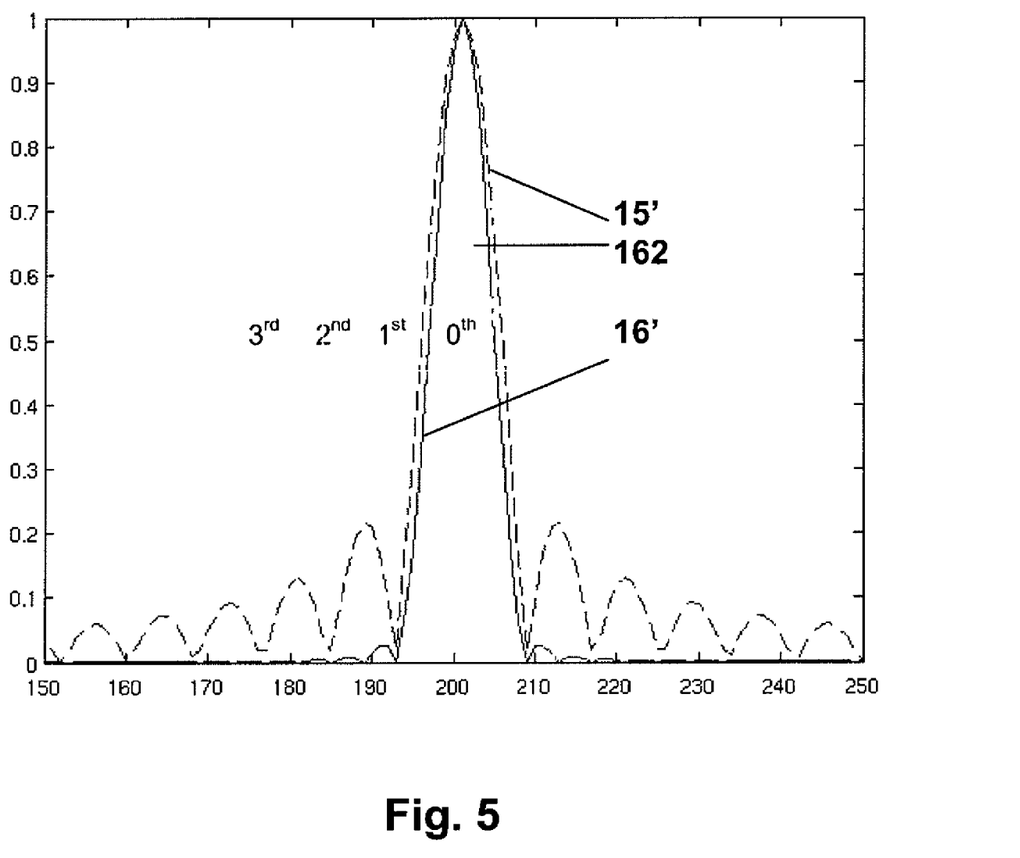
FIG. 5 shows Fourier transforms for a fill factor of 100% for rectangular transmissive pixels (broken line) and for pixels smoothened by an apodisation function (solid line). The diffraction orders are indicated by vertical broken lines.

The graph 15' of the Fourier transform of a non-apodisated transmissive pixel 11' and the smoothened graph 16' are shown again for a fill factor of 100% in FIG. 5 so as to allow comparison. The effects of the pixel smoothing on the Fourier transform 16' can be seen very clearly also for the fill factor of 100%, where the central band 162 is about as wide as with a fill factor of 85%, but where the side bands are slightly higher. In contrast, the Fourier transform of a non-apodisated transmissive pixel 11' is much more sensitive to the fill factor (cf. graphs 15 and 15'), where the central band becomes wider the smaller the fill factor. The diffraction orders 1, 2, 3 are indicated by vertical broken lines.

Figure 6:
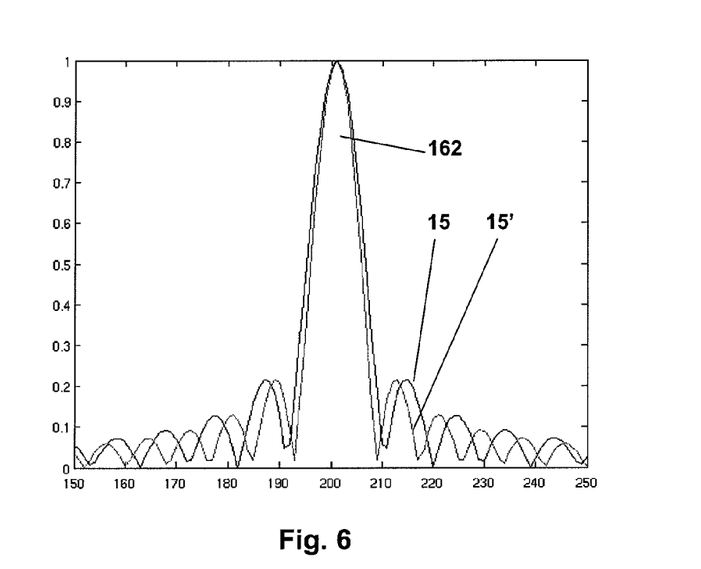
FIG. 6 shows Fourier transforms of pixels without apodisation for a modulator with a fill factor of 85% (black line) and for a modulator with a fill factor of 100% (grey line).

FIG. 6 shows another comparison of the sinc graph 15 for a fill factor of 85% (black line) and the sinc graph 15' for a fill factor of 100% (grey line) of the Fourier transform of non-apodisated transmissive pixels 11'.

The difference is in the position of the diffraction orders: they move outward the smaller the fill factor.

Figure 3:
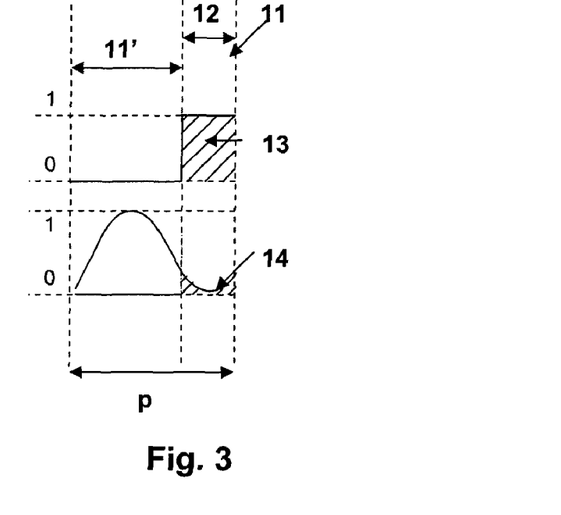
FIG. 3 shows two cases of the distribution of energy portions E, E' near an inter-pixel:
  a) homogeneous illumination without apodisation function for portion E,
  b) modulated illumination with apodisation function for portion E'.

The occurring energy portions which account for the inter-pixels 12 can be specified for the following two cases with the help of the diagram in FIG. 3:
a) Non-apodisated illumination—energy portion E,
b) Apodisated illumination—energy portion E', In the former case a), the inter-pixel amplitude 13 related to homogeneous illumination of a spatial light modulator is specified. In the latter case b), the inter-pixel amplitude 14 is specified for the same a spatial light modulator, but for modulated illumination.

Equations (III) below describe for a fill factor of 85% the energy portions E and E' of the illumination which account for an inter-pixel 12 in the two cases:

$$E = \int_{0.85}^{1} 1^2 \, dx = 0.15 \quad (III)$$

$$E' = \int_{0.85}^{1} (\sin^2(\pi(x+0.075)))^2 \, dx$$

$$= \int_{0.925}^{1.075} (\sin^2(\pi x))^2 \, dx$$

$$= 2\int_{0.925}^{1} (\sin^4(\pi x)) \, dx$$

$$2\left(\frac{1}{8}\int_{0.925}^{1} \cos(4\pi x)\,dx - \frac{1}{2}\int_{0.925}^{1} \cos(2\pi x)\,dx + \int_{0.925}^{1} \frac{3}{8}\,dx\right) 8.8 \times 10^{-5}$$

The total energy $E_t$, $E_t'$ in a pixel 11 (transmissive pixel 11' plus inter-pixel 12) in the two cases is described by the equations (IV):

$$E_t = \int_0^1 1^2 \, dx = 1 \quad (IV)$$

$$E_t' = \int_0^1 (\sin^2(\pi x))^2 \, dx = \frac{3}{8}$$

The following energy portions in the inter-pixel areas can be derived in the two cases:

$$\frac{E}{E_t} = 15\% \quad (V)$$

$$\frac{E'}{E_t'} = 0.02\%.$$

As shown in the expressions (V), the energy portion that accounts for an inter-pixel 12 is extremely low (0.02%) compared with the total energy radiated towards the pixel 11 (=11'+12) if the incident wave 7 or 8, respectively, is modulated such as to achieve apodisation, according to this invention. That energy portion is much higher (15%) if the incident sub-waves 7, 8 are not modulated by an apodisation function.

Consequently, at the same time undesired effects due to a direct reflection at the inter-pixel matrix are reduced much more efficiently if the illumination is modulated with an apodisation function.

Figure 7:
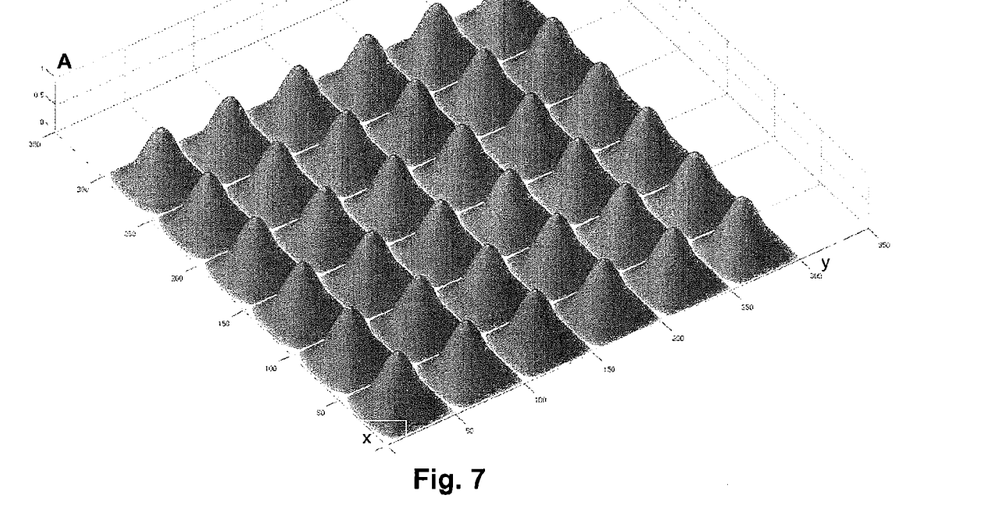
FIG. 7 shows a three-dimensional view of the amplitude $A = A(x,y)$ of the illumination on one of the spatial light modulators with an apodisation in two directions.

FIG. 7 shows a three-dimensional view of the amplitude $A=A(x,y)$ of the incident wave 10 of a spatial light modulator, where the modulation is performed in two directions x, y (two-dimensional apodisation).

Figure 8:
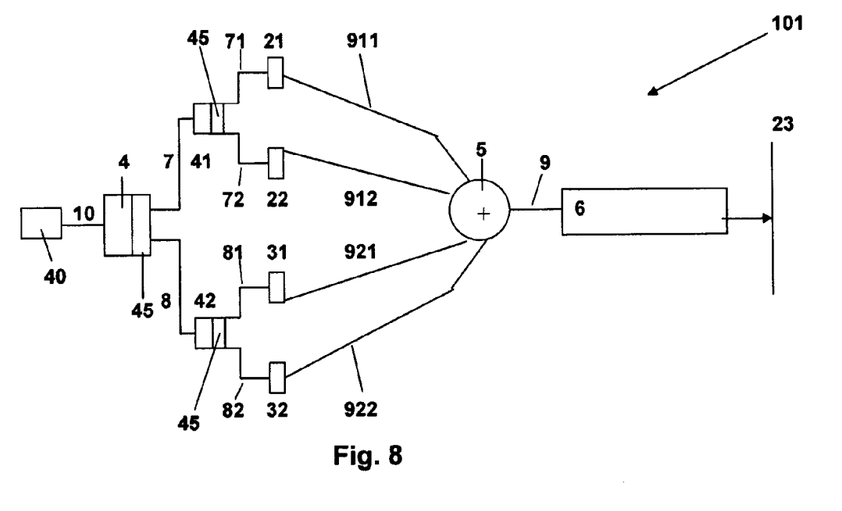
FIG. 8 shows schematically a second device according to the invention for the two-dimensional generation of reconstructions with the help of four spatially separated spatial light modulators.

In order to achieve apodisation in two directions, the device 1 from FIG. 1 is modified such that it comprises four spatial light modulators 21, 22, 31, 32, as shown in FIG. 8.

FIG. 8 shows a second embodiment 101 of the device according to the invention, which comprises four spatial light modulators 21, 22, 31, 32, which represent a two-dimensional virtual apodisation spatial light modulator.

The device 101 for the generation of reconstructions based on information encoded on spatial light modulators 21, 22, 31, 32 with the help of coherent incident waves 10 comprises the following components:

A light source 40 for the illumination of the spatial light modulators with coherent incident waves 10, A first beam splitter device 4, which is disposed downstream the light source 40 and which splits the incident wave 10 up into incident sub-waves 7, 8, Two further beam splitter devices 41, 42, disposed downstream the first beam splitter device 4, where the beam splitter device 41 splits the incident sub-wave 7 into further sub-waves 71, 72 and the beam splitter device 42 splits the incident sub-wave 8 into further sub-waves 81, 82, Four spatial light modulators 21, 22, 31, 32 which receive the respective directed incident sub-waves 71, 72, 81, 82 from the beam splitter devices 41, 42, wherein the sub-waves 911, 912 and 921, 922 emitted by the spatial light modulators 21, 22, 31, 32 are recombined by an optical system 5 so as to form a common emitted wave 9 which exits towards a projection system 6.

According to the invention, each beam splitter device 4, 41, 42 is allocated at least one element 45 each for the generation of incident sub-waves 7, 8, 71, 72, 81, 82 modulated with complementary apodisation functions, where the modulated incident sub-waves 71, 72, 81, 82 are directed to the corresponding spatial light modulators 21, 22, 31, 32, and where there is at least one optical system 5 which combines by way of addition the sub-waves 911, 912, 921, 922 which are emitted by the spatial light modulators 21, 22, 31, 32 so as to form a common emitted wave 9, which is then transformed by the projection system 6 into the Fourier plane 23.

The amplitudes of the incident wave 10 and of the modulated incident sub-waves 7, 8 and 71, 72, 81, 82 are thereby defined as follows:

Incident wave 10 with A=1 at homogeneous illumination
First incident sub-wave 7 with $A_1=\cos^2 x$
Second incident sub-wave 8 with $A_2=\sin^2 x$
Third incident sub-wave 71 with $A_3=\cos^2 x * \cos^2 y$
Fourth incident sub-wave 72 with $A_4=\cos^2 x * \sin^2 y$
Fifth incident sub-wave 81 with $A_5=\sin^2 x * \cos^2 y$
Sixth incident sub-wave 82 with $A_6=\sin^2 x * \sin^2 y$
where $A_1+A_2=A$ and $A_3+A_4+A_5+A_6=A$, and where the pairs of incident sub-waves $A_1$, $A_2$ and $A_3$, $A_4$ and $A_5$, $A_6$ are complementary incident sub-waves.

The device 101 according to the second embodiment basically employs the same method according to the invention as the above-described device 1.

Figure 9:
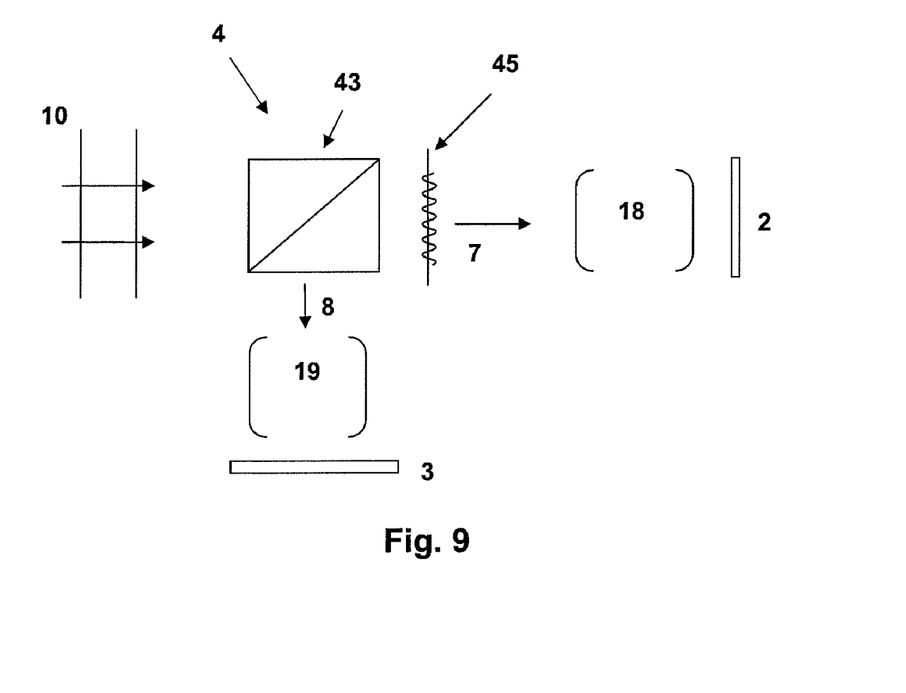
FIG. 9 shows schematically a device with an element for the generation of two complementary incident sub-waves with the help of a semi-transmissive $\cos^2$ grating.

FIG. 9 shows a detail of the beam splitter device 4 in the device 1 according to FIG. 1 together with an element 45 for the generation of incident sub-waves 7, 8 modulated with complementary apodisation functions, where the element 45 may be a semi-transmissive $\cos^2$ grating.

The first beam splitter device 4 comprises the beam splitter 43, the semi-transmissive $\cos^2$ grating 45 for the generation of a modulated incident sub-wave 7 with $A_1=\cos^2$ and a modulated incident sub-wave 8 with $A_2=1-\cos^2(x)=\sin^2(x)$, where the $\cos^2$ grating 45 is disposed between the beam splitter 43 and an optical system 18 which directs the modulated incident sub-wave 7 to the spatial light modulator 2. The beam splitter 43 lets the incident wave 10 pass and after reflection at the $\cos^2$ grating the reflected modulated incident sub-wave 8 with $A_2=1-\cos^2=\sin^2$ is also reflected to the second spatial light modulator 3. The modulated incident sub-wave 8 with $A_2=1-\cos^2=\sin^2$, which leaves the beam splitter 43, is directed to the second spatial light modulator 3 by another optical system 19.

Figure 10:
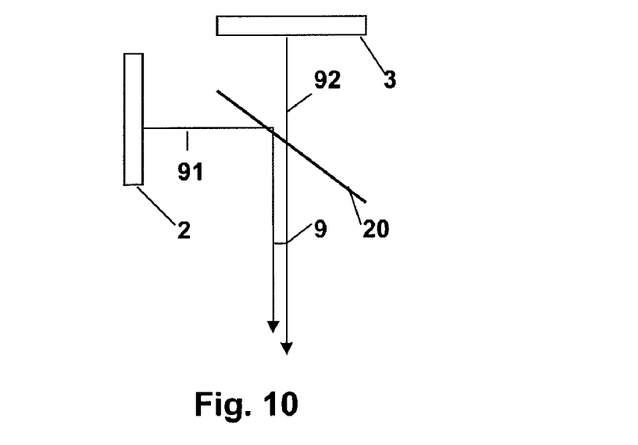
FIG. 10 shows schematically an optical system which combines the sub-waves emitted by the spatial light modulators by way of addition in the form of a semi-transmissive plate.

The combining optical system used for additive combination of the two modulated incident sub-waves 7, 8 after their passage through the spatial light modulators 2, 3 may alternatively be an optical adder 20, i.e. a semi-transmissive plate.

Figure 11:
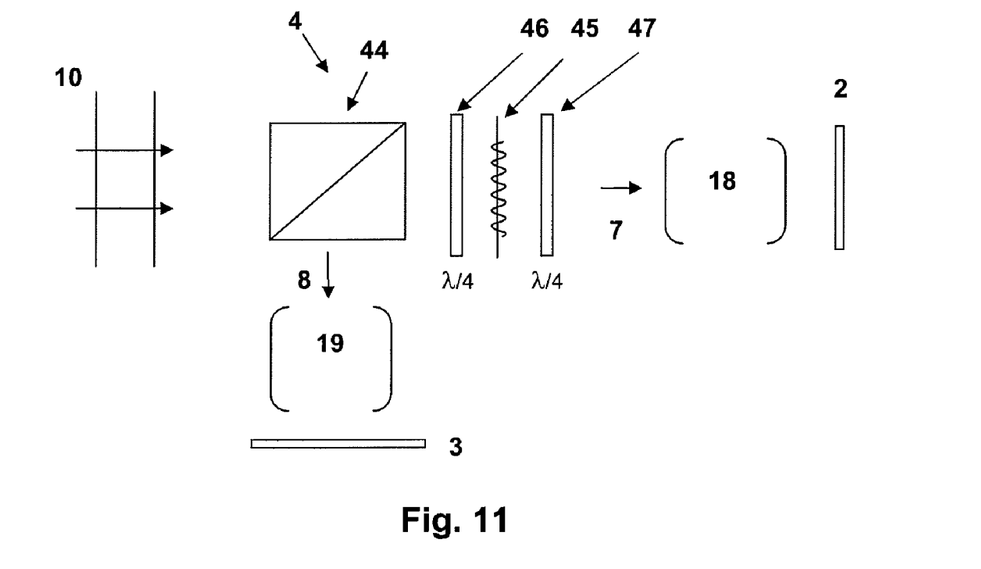
FIG. 11 shows schematically a device according to the invention with an element for the generation of two complementary incident sub-waves and a polarising beam splitter.

FIG. 11 shows another version of a first beam splitter device 4 and of an element for the generation of complementary incident sub-waves 7, 8 modulated with corresponding apodisation functions, where a polarising beam splitter 44 is used instead of the simple beam splitter 43 for the generation of two complementary incident sub-waves 7, 8. The advantage of such a beam splitter is that the incident wave is allowed to pass completely first and after reflection at the $\cos^2$ grating 45 the beam is again completely reflected towards the second modulator.

The polarising beam splitter 44 is followed by a combination of a first $\lambda/4$ wave plate 46, the semi-transmissive $\cos^2$ grating 45 and a second $\lambda/4$ wave plate 47, in order to achieve that the polarisation of the incident sub-wave 8 reflected at the $\cos^2$ grating is performed with a 90° turn ($\lambda/4+\lambda/4=\lambda/2$) before the wave enters the beam splitter 44. The second $\lambda/4$ wave plate is used here in order to ensure that the incident sub-wave 7 is in the same polarisation plane as the incident sub-wave 8 when it hits the modulator 2.

Generally, the device 1 can comprise more than two spatial light modulators, as shown in FIG. 8.

With the illumination modulated in order to achieve apodisation, and the lateral offset of the spatial light modulators 2, 3 and 21, 22, 31, 32, and the smoothing of the illumination of the encoded pixels 11 and their adaptation, it is possible to substantially improve the resolution of the virtual spatial light modulators and thus of the reconstructions. The resolution is multiplied at least by a factor of 2.

The periodic amplitude modulation according to the invention is not limited to the use of the complementary $\cos^2$ or $\sin^2$ apodisation functions. The beam splitter devices 4, 41, 42 can be designed in conjunction with an element 45 for the generation of a modulated illumination for the spatial light modulators 2, 3 and 21, 22, 31, 32 such that other periodic functions can be considered as well.

For example, the known Blackman function can be used, where the function is described in one period by the following equation:

$$f(k+1) = 0.42 - 0.5\left(1 - \cos\left(\frac{2\pi k}{n-1}\right)\right) + 0.08\left(1 - \cos\left(\frac{4\pi k}{n-1}\right)\right), \quad \text{(VI)}$$

where n is the total number of points in the period, which is defined to be the pixel pitch p, and where k defines a range from 0 to n−1, and where f(k+1) is the amplitude of the k+1st point.

Figure 12:
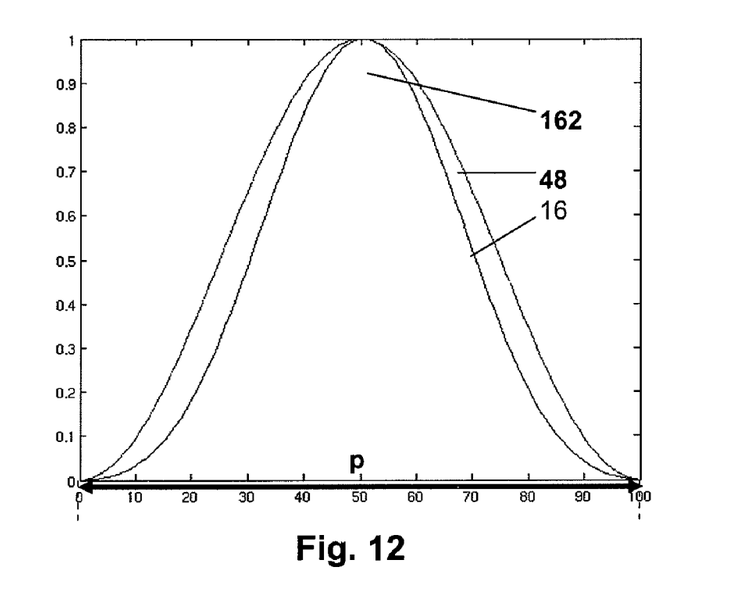
FIG. 12 shows the effect of a $\sin^2$ pixel smoothing (inner line) and a Blackman pixel smoothing (outer line).

FIG. 12 shows the difference in the Fourier transform between the Blackman function 48 and the sin² function 16 for a pixel pitch p and a fill factor of 85%, where the inner line 16 indicates the sin² transparency smoothing and the outer line 48 indicates the Blackman transparency smoothing.

In the Fourier plane 23 the Blackman transparency smoothing 48 produces a Fourier transform with a central band 162, which is slightly wider than that of the Fourier transform with the sin² smoothing 16. However, with a fill factor of 100% (not shown) the central band 162 is as wide as that of the sin² graph 16.

The advantage of the Blackman transparency smoothing is that the graph 48 only exhibits very few and very low-amplitude side bands in the Fourier plane 23. With a fill factor of 100% the side bands disappear almost completely.

Figure 13:
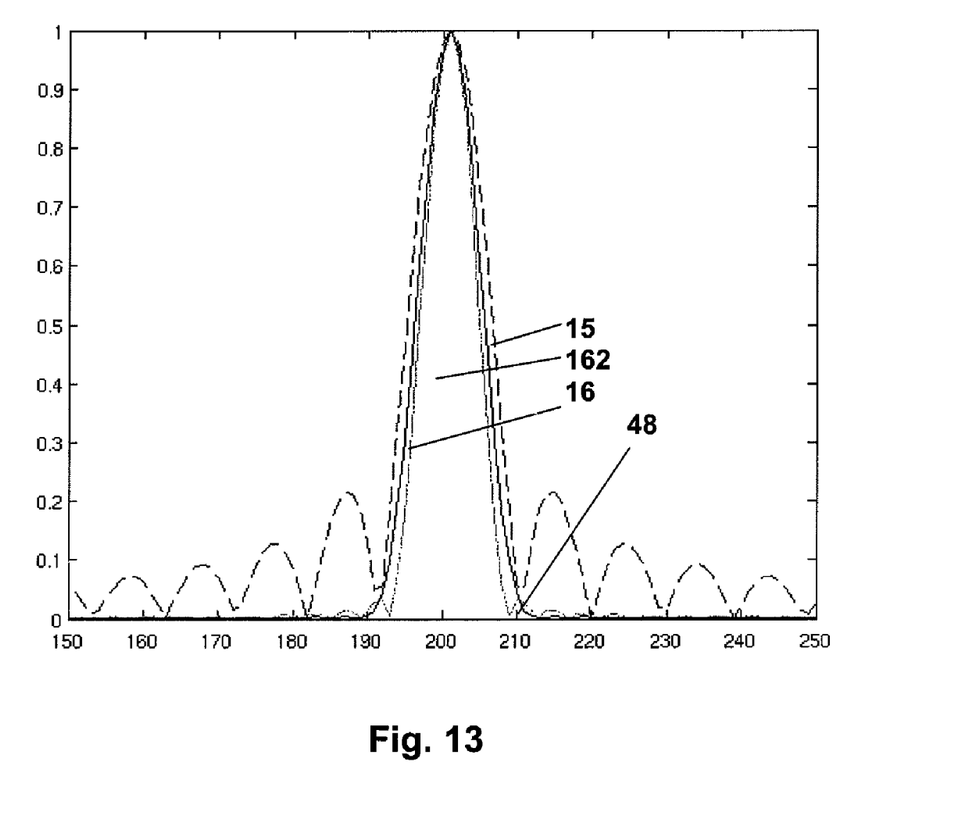
FIG. 13 shows a comparison of the Fourier transforms for a fill factor of 85% for an ordinary rectangular transmissive pixel (broken black line), for a $\sin^2$ pixel smoothing (solid grey line) and for a Blackman pixel smoothing (solid black line).

FIG. 13 shows the transforms in the Fourier plane 23 for a fill factor of 85% and an ordinary rectangular transmissive pixel 11' (broken black line 15), for a sin² smoothing (solid grey line 16) and for a Blackman transparency smoothing (solid black line 48).

The side bands are almost completely eliminated with the Blackman transparency smoothing 48, so that it is confirmed that the Blackman transparency smoothing 48 can lead to a very high resolution of the reconstructions which can for example be generated based on the holograms.

Moreover, the modulation of the illumination for the purpose of apodisation can also be performed by phase modulation instead of amplitude modulation. By modulating both amplitude and phase, the Fourier transform can be formed optimally. According to the invention, a periodic modulation must be performed across the entire spatial light modulator again though.

As a summary it can be said that the characteristics of the present invention lead to the following effects:
1. By modulating the illumination, higher diffraction orders of the Fourier transform are widely suppressed.
2. By adjusting the minima of the modulated illumination such that they coincide with the inter-pixels, disturbing reflections in the reconstructions are widely avoided.
3. Thanks to the one-dimensionally or two-dimensionally offset and interlaced additive arrangement of the spatial light modulators, the resolution and thus the quality of the reconstructions are substantially improved.

The invention claimed is:

1. Method for the generation of reconstructions of information encoded on spatial light modulators by way of illumination with coherent incident waves, where the information is encoded in controllable pixels of a pixel matrix with an inter-pixel matrix in the form of an electrode grid, which is contained in a spatial light modulator, containing the following steps:

Splitting of the incident wave into at least two incident sub-waves,

Modulation of the incident sub-waves with the help of selected apodisation functions so as to form modulated incident sub-waves, Direction of the modulated incident sub-waves towards the corresponding, spatially separated and pixel-matrix-shifted spatial light modulators, Diffraction of the modulated incident sub-waves at the encoded pixels of the respective spatial light modulators, Additive combination of the sub-waves emitted by the respective spatial light modulators to form one common emitted wave, and Transformation of the emitted wave into the Fourier plane with the help of a projection system.

2. Method according to claim 1 wherein pairs of incident sub-waves which fall on two corresponding spatial light modulators are modulated by complementary apodisation functions.

3. Method according to claim 2 wherein the complementary modulated incident sub-waves are generated on the basis of the original incident wave, where the incident sub-waves are coherent among one another and their amplitudes show a periodicity with local minima and local maxima.

4. Method according to claim 1, wherein if illuminated with coherent light, the pixels of the spatially separated spatial light modulators are centered on to the amplitude maximum of the respective incident sub-wave, where the inter-pixels adjacent to the pixels are situated in an amplitude minimum.

5. Method according to claim 1, wherein always a pair of spatial light modulators are disposed at a shift in one or two dimensions such that the pixels of the spatial light modulators are offset by a given distance, while the corresponding minima of the amplitudes of the incident wave modulated with the apodisation function are always situated near the inter-pixels.

6. Method according to claim 5 wherein the pixels of the spatial light modulators are offset by half a pixel pitch.

7. Method according to claim 1, wherein by way of modulating the incident sub-waves a suppression of higher diffraction orders in the Fourier plane is achieved and the light energy is concentrated in the zeroth diffraction order.

8. Method according to claim 1, wherein the modulation of the incident sub-waves is either an amplitude modulation or a phase modulation or a combination of the two, whereby an optimal intensity distribution is achieved in the Fourier plane and higher diffraction orders are suppressed.

9. Device for the generation of reconstructions of information encoded on spatial light modulators by way of illumination with coherent incident waves, where the information is encoded in controllable pixels of a pixel matrix with an inter-pixel matrix in the form of an electrode grid, which is contained in a spatial light modulator, containing the following components:

A light source for the illumination of the spatial light modulators with coherent incident waves, A beam splitter element, which is disposed downstream the light source and which splits the incident wave up into incident sub-waves, At least two spatial light modulators which receive the respective directed incident sub-waves from the beam splitter element, where sub-waves emitted by the spatial light modulators are combined to form a common emitted wave, which is directed towards a projection system, operated to implement the method according to claim 1, characterised in that the beam splitter element corresponds with at least one element for the generation of incident sub-waves by way of modulation with according apodisation functions of the incident wave, where the modulated incident sub-waves are directed to the corresponding spatial light modulators, and where there is at least one optical system which combines by way of addition the sub-waves which are emitted by the spatial light modulators so as to form a common emitted wave, which is then transformed by the projection system into the Fourier plane.

10. Device according to claim 9 wherein pairs of incident sub-waves which fall on two corresponding spatial light modulators are modulated by complementary apodisation functions.

11. Device according to claim 10 wherein the amplitudes of the incident wave and of the incident sub-waves are defined as follows:
Incident wave with the amplitude A=1 at homogeneous illumination
First incident sub-wave with $A_1=\cos^2 x$
Second incident sub-wave with $A_2=\sin^2 x$
where $A_1+A_2=A$, and $A_1=\cos^2 x$ and $A_2=\sin^2 x$ are the incident sub-waves which are modulated with selected apodisation functions.

12. Device according to claim 10 wherein as an element for apodisation by way of modulating the illuminating light, the semi-transmissive $\cos^2$ grid for generating the modulated incident sub-waves $A1=\cos^2(x)$ and $A2=\sin^2(x)$ is assigned to the beam splitter element, where the $\cos^2$ grid is disposed between the beam splitter and an optical system which directs the modulated incident sub-wave to the first spatial light modulator, and where the incident sub-wave with $A2=\sin^2(x)$ which leaves the beam splitter is directed through another optical system to the second spatial light modulator.

13. Device according to claim 9, wherein a virtual spatial light modulator consists of at least two spatial light modulators, where the spatial light modulators are arranged such that the pixels of the spatially separated spatial light modulators are centered on to the amplitude maximum of the respective incident sub-wave, where the inter-pixels next to the pixels are situated in an amplitude minimum of the incident sub-wave.

14. Device according to claim 13 wherein the spatial light modulators are disposed such that in their additive arrangement the pixels of the spatial light modulators are shifted by a given pixel distance.

15. Device according to claim 14 wherein the pixels of the spatial light modulators are shifted by half a pixel pitch.

16. Device according to claim 9, wherein the apodisation is realised in one dimension if two spatial light modulators are used in additive arrangement, while the apodisation is realised in two dimensions if four spatial light modulators are used in additive arrangement.

17. Device according to claim 9 wherein the first beam splitter element, which is disposed downstream the light source, and which splits the incident wave up into two incident sub-waves,
is followed by two further beam splitter elements, where the beam splitter element splits the incident sub-wave into further sub-waves and the beam splitter element splits the incident sub-wave into further sub-waves,
and that four spatial light modulators are arranged downstream the beam splitter elements, said spatial light modulators receiving the respective directed incident sub-waves from the beam splitter elements,
where the beam splitter elements correspond with at least one respective element each for the generation of incident sub-waves modulated with complementary apodisation functions, where the incident sub-waves are directed to the corresponding spatial light modulators, and where the optical system combines by way of addition the sub-waves which are emitted by the spatial light modulators so as to form a common emitted wave, which is then transformed by the projection system into the Fourier plane.

18. Method according to claim 17 wherein pairs of incident sub-waves which fall on two corresponding spatial light modulators are modulated by complementary apodisation functions.

19. Device according to claim 17 wherein the amplitudes of the incident wave and of the incident sub-waves are defined as follows:
Incident wave with the amplitude A=1 at homogeneous illumination
First incident sub-wave with $A_1=\cos^2 x$
Second incident sub-wave with $A_2=\sin^2 x$
Third incident sub-wave with $A_3=\cos^2 x * \cos^2 y$
Fourth incident sub-wave with $A_4=\cos^2 x * \sin^2 y$
Fifth incident sub-wave with $A_5=\sin^2 x * \cos^2 y$
Sixth incident sub-wave with $A_6=\sin^2 x * \sin^2 y$
where $A_1+A_2=A$ and $A_3+A_4+A_5+A_6=A$, and where the incident sub-waves $A_1, A_2, A_3, A_4, A_5, A_6$ are modulated illumination waves.

20. Device according to claim 9, wherein the element for the generation of incident sub-waves with complementary apodisation functions is a semi-transmissive $\cos^2$ grid.

21. Device according to claim 9, wherein the combining optical system for additive combination of the incident sub-waves to form a common emitted wave is a semi-transmissive plate.

22. Device according to claim 9 wherein a polarising beam splitter is used instead of a simple beam splitter for the generation of two complementary incident sub-waves, where the polarising beam splitter is followed by a combination of a first $\lambda/4$ wave plate, the semi-transmissive $\cos^2$ grid and a second $\lambda/4$ wave plate, where the polarisation plane of the incident sub-wave which is reflected at the $\cos^2$ grid is turned by an angle of 90° before it enters the beam splitter, and where the passing wave after passage through the second $\lambda/4$ wave plate is also turned by an angle of 90°, so that the resulting emitted sub-waves have the same orientation, as regards their polarisation, before they are recombined to form a common emitted wave.

23. Device according to claim 9 wherein the beam splitter element corresponds optically with at least one element for the modulation of the incident sub-waves such that an apodisation function called a Blackman function, which efficiently suppresses the higher diffraction orders of the Fourier transform, is provided for the generation of the modulated incident sub-waves.

* * * * *